United States Patent [19]

Leo et al.

[11] Patent Number: 4,696,506
[45] Date of Patent: Sep. 29, 1987

[54] WHEEL SET FOR RAIL VEHICLES

[75] Inventors: Rolf Leo, Wertingen; Karl-Heinz Meusel; Alfred Uttner, both of Donauwoerth all of Fed. Rep. of Germany

[73] Assignee: Messerschmitt-Boelkow-Blohm Gesellschaft mit beschraenkter Haftung, Munich, Fed. Rep. of Germany

[21] Appl. No.: 815,399

[22] Filed: Dec. 31, 1985

[30] Foreign Application Priority Data

Jan. 18, 1985 [DE] Fed. Rep. of Germany ....... 3501488

[51] Int. Cl.⁴ ........................ B60B 35/14; B61F 5/38
[52] U.S. Cl. ........................................ 295/38; 295/39; 464/29
[58] Field of Search ................ 295/36 R, 37, 38, 39, 295/40; 301/124 R, 126; 192/21.5; 464/29, 182

[56] References Cited

U.S. PATENT DOCUMENTS

| | | | |
|---|---|---|---|
| 1,206,583 | 11/1916 | Palley | 295/37 |
| 2,073,829 | 3/1937 | Brown | 295/38 |
| 2,772,762 | 12/1956 | Gamundi et al. | 192/21.5 |
| 2,809,731 | 10/1957 | Rau | 192/21.5 |
| 4,307,910 | 12/1981 | Rodney | 295/39 |

FOREIGN PATENT DOCUMENTS

| | | |
|---|---|---|
| 1035419 | 7/1958 | Fed. Rep. of Germany . |
| 2259035 | 9/1979 | Fed. Rep. of Germany . |
| 2848398 | 11/1979 | Fed. Rep. of Germany ........ 295/37 |
| 3117126 | 11/1982 | Fed. Rep. of Germany . |
| 3019573 | 12/1982 | Fed. Rep. of Germany . |

Primary Examiner—Randolph A. Reese
Attorney, Agent, or Firm—W. G. Fasse; D. H. Kane, Jr.

[57] ABSTRACT

A wheel set for rails has a divided axle and two wheels rigidly attached to the respective axle section. The axle sections are interconnected in a force transmitting manner by a clutch for adjusting a differential r.p.m. between the two axle sections. However, the clutch components also permit a relative rotation when the clutch is not energized. The clutch has an inner clutch component and an outer clutch component forming a work gap (7.4) between the clutch components. The work gap extends concentrically to the rotational axis of the shaft and is filled with a magnetizable powder for engaging and disengaging the clutch components which are so mounted to the respective axle section that an axial displacement of the clutch components relative to each other is prevented.

5 Claims, 1 Drawing Figure

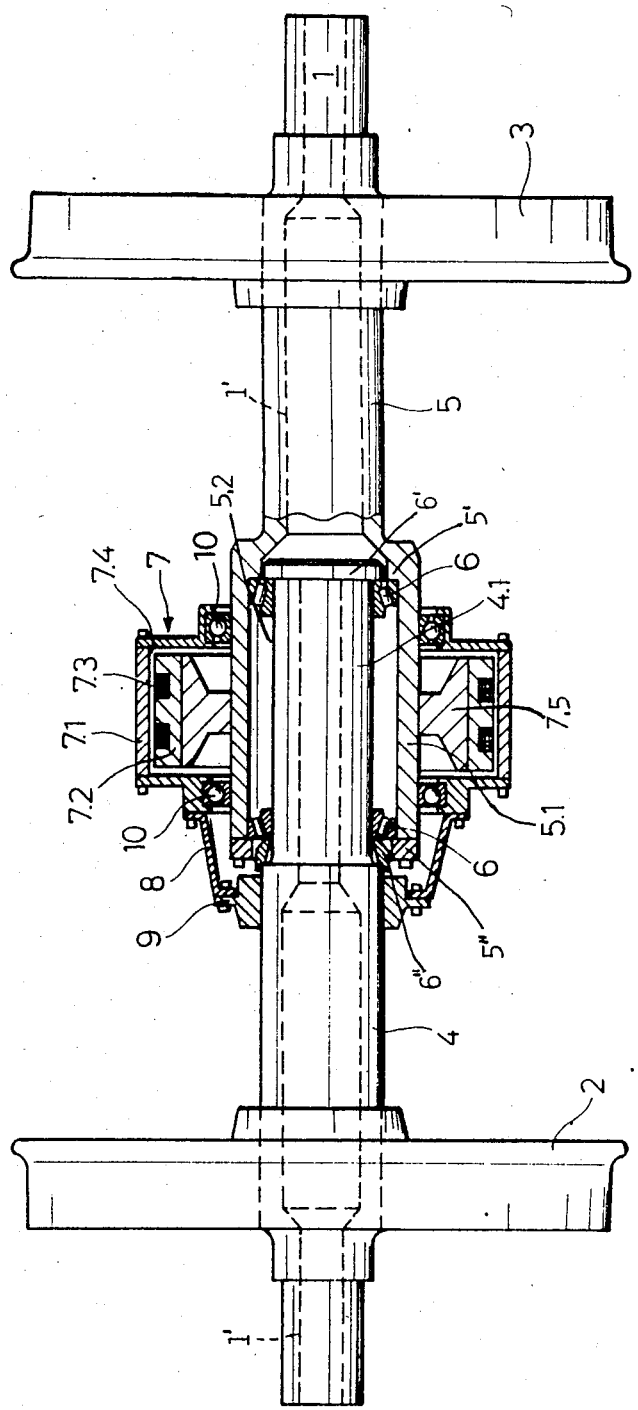

WHEEL SET FOR RAIL VEHICLES

FIELD OF THE INVENTION

The invention relates to wheel sets for rail vehicles. Each wheel set comprises two wheels and an axle. The wheels are rigidly attached to the axle and have a wheel rim profiled for the rails. A clutch is inserted between the two wheels for the adjustment of a differential r.p.m. The clutch may have two clutch components arranged to form a working gap concentrically around the rotational axis of the shaft. A magnetizable powder is inside the gap for operating the clutch.

DESCRIPTION OF THE PRIOR ART

German Patent (DE-PS) No. 3,019,573 discloses a gage guide for wheel sets of a rail vehicle bogie. In such a known wheel set the clutch has the function to partially decouple the wheels of a set from each other when the wheels run along a track and should have different rolling radii. In other words, the clutch permits establishing a differential r.p.m. between the two wheels of a set in order to reduce the longitudinal slip of the wheels relative to the rails, thereby stabilizing the rolling of the wheel set. The torque moment or so-called slip moment that can be transmitted through such a clutch is variable by the magnetizing effect applied to a powder which is contained in a gap between the first and second clutch components.

Another advantage is seen in that, due to the clutch, the wheel set is enabled to better run through narrow or tight rail bends. Such good guide characteristics of the wheel set in a tight track bend are achieved by simply eliminating the slip while the wheel set is negotiating a tight track bend and provided an adjusted slip on straight track sections. Further, the known wheel set according to the above German Pat. No. 3,019,573 employs preferably so-called loose wheels, that is, the wheels are mounted to the axle in a rotatable manner while the axle itself is rigidly secured to the frame structure or bogie. Due to this construction, it is necessary to provide support bearings between the clutch components and the axle. Such support bearings for the clutch are necessarily exposed to the same high r.p.m.s as the wheel bearings. Accordingly, the clutch support bearings are subject to the same wear and tear as the wheel bearings so that expensive special bearings must also be provided for the clutch.

German Patent Publication (DE-OS) No. 3,117,126 discloses a shaft clutch connection which is an example for the extent of the efforts and expenses that are needed to provide the proper bearings for the known clutch. Additionally, due to the uninterrupted, one piece shaft or axle, it is necessary to provide clutch component structures requiring tubular type half axles which have a substantial cantilevering length. These cantilever type half axles must have a sufficiently large diameter so that they may surround the single piece axle or shaft. Thus, the clutch components have a diameter substantially larger than the axle or shaft, whereby it becomes difficult to find space for the installation of the disk brakes that are needed for high speed trains in the wheel set. This problem becomes even more pronounced when the disk brakes must have a substantial braking capacity having regard to the high train speeds that are involved in actual railroad operations.

U.S. Pat. No. 1,206,583 discloses a divided axle for rail wheel sets also known as so-called differential wheel sets. The main purpose of the known wheel set was an adaptation of the rail wheel sets to the characteristics of wheels for road vehicles so that the rail wheel sets would solve the motion and wear and tear problems which have been caused by tight rail bends.

German Patent Publication (DE-AS) No. 2,259,035 discloses a gage guide for wheel sets in which a differential gear system is inserted in the axle. The gage of the wheels can be modified in this type of arrangement, but the axle remains a rigid axle rather than a divided axle.

German Patent Publication (DE-OS) No. 1,035,419 discloses a typical clutch or brake operation with a magnetizable powder.

OBJECTS OF THE INVENTION

In view of the foregoing it is the aim of the invention to achieve the following objects singly or in combination:

to construct a wheel set of the type mentioned above in such a manner that special types of support bearings between the clutch components and the axle or shaft are obviated, whereby to provide sufficient space and other advantages for the installation of wheel brakes;

to avoid subjecting the support bearings for the clutch components to high wear and tear; and to utilize a divided wheel set axle for the purpose of simplifying the construction of the clutch components.

SUMMARY OF THE INVENTION

The above objectives have been achieved according to the invention in a wheel set of the above described type which is characterized in that the axle or shaft is divided into two half axles or sections which are individually rotatable, but rigidly held in place relative to each other in the axial direction. First bearings in the form of radial bearings take up axial forces of the two wheels. These first radial bearings are located in an axle or shaft zone in which one half axle or section having a stub at its free end is inserted into a cylindrical cavity of the other half axle or section. The other axle section due to its cylindrical cavity is hollow, at least near the center of the wheel set. The clutch has two clutch components including a radially inner clutch component rigidly secured to the hollow axle section, and a radially outer clutch component rigidly mounted in a torsion stiff manner to the axle section having the axle stub. In the simplest manner, the radially outer clutch component, especially if it is lightweight, is cantilevered to reach around the hollow axle section to permit relative rotation between the hollow axle section and the outer clutch component. If the outer clutch component should be heavier, second bearings are inserted between the outer clutch component and the hollow axle section. Both axle sections may be hollow throughout for weight reduction.

It is an advantage of the invention that basically only two clutch components are necessary, whereby both components are supported by the shaft section having the hollow end in such a way that one clutch component is rigidly secured to the hollow end while the other is rotatably secured to the hollow end. In this manner the clutch components are required to merely take up the differential r.p.m. between the two half axles or sections so that basically the clutch is subject to wear and tear of a quasi-static type which is substantially smaller than a dynamic wear and tear.

BRIEF DESCRIPTION OF THE DRAWING

In order that the invention may be clearly understood, it will now be described, by way of example, with reference to the accompanying drawing, in which the single FIGURE shows a wheel set according to the invention, partially in section.

DETAILED DESCRIPTION OF A PREFERRED EXAMPLE EMBODIMENT AND OF THE BEST MODE OF THE INVENTION

The present wheel set comprises an axle 1 which may be hollow throughout as indicated by the dashed lines 1'. The axle 1 is divided into two axle sections 4 and 5. Each axle section carries a wheel 2 and 3 respectively. By dividing the axle 1 into two axle sections 4, 5 the wheels 2 and 3 may be at least partially decoupled from each other with the aid of a clutch 7. The axle section 4 comprises a free end axle stub 4.1 forming a radially inner axle section end which reaches into a cavity 5.2 formed inside a hollow end 5.1 of the axle section 5. The hollow end 5.1 forms a radially outer axle section end because it surrounds the radially inner axle stub 4.1. The stub 4.1 is supported by first radial bearings 6 inside the cavity 5.2. The radial bearings 6 forming first bearing means prevent an axial displacement of the axle sections 4 and 5 relative to each other, however permitting a relative rotation of the two axle sections. The inner races of the radial bearings 6 are held in place by an end cup 6' secured to the free end of the stub 4.1 and by a mounting ring 6" which may also form a seal. The outer races of the radial bearings 6 are held against a shoulder 5' of the shaft section 5 and by a further mounting ring 5" held in place by screws reaching into the free end of the hollow portion 5.1 of the shaft section 5.

The radial bearings 6 are roller bearings and are held in place against axial displacement relative to each other so that axial forces effective on the wheels are taken up.

The magnetic clutch 7 comprises a radially outer clutch component 7.1 and a radially inner clutch component 7.2. The magnetically effective portions of the clutch components 7.1 and 7.2 form a gap 7.4 therebetween which is filled with a magnetizable powder not shown. This magnetizable powder is magnetized by the magnetizing coils 7.3 located in the circumference of the radially inner clutch portion 7.2 which is rigidly secured to the cavity forming portion 5.1 of the axle section 5. The two clutch components 7.1 and 7.2 extend coaxially to the longitudinal, rotational axis of the axle 1. Depending on the degree of magnetization of the powder in the gap 7.4, a friction type connection is established between the two clutch components 7.1 and 7.2, whereby the size of the transmitted torque moment can be controlled by the energizing current through the energizing coils 7.3, or rather by the size of said energizing current.

In the construction according to the invention one axle section 4 constitutes a connecting element between the respective wheel 2 and the radially outer clutch component 7.1 of the clutch 7. The radially inner clutch component 7.2 is rigidly connected to the wheel 3 through a disk member 7.5 rigidly secured to the inner clutch component 7.2 and to the hollow radially outer axle section end 5.1 and thus through the other axle section 5. The radially inner clutch component 7.2 is secured directly to the hollow cylindrical end 5.1 forming a radially outer end of the axle section 5 by said disk member 7.5, whereby the required force transmission is assured, for example, by a so-called shrinking fit. The outer clutch component 7.1 is secured to the respective axle section 4 through a cantilevered type of connecting member 8 forming third connecting means reaching in a cantilever fashion around the hollow portion 5.1 for connection to the radially outer clutch component 7.1. The other end of the connecting member 8 is secured to a so-called catch ring 9 which in turn is rigidly secured to the axle section 4 in a torque transmitting manner. Here again, the catch ring 9 may sit on the axle section 4 with a shrink or press fit just as the ring of the radially inner clutch component 7.2 is press or shrink fitted on the hollow portion 5.1.

Depending on the size and weight of the outer clutch component 7.1, it may be desirable to support the outer clutch component 7.1 by one or two radial bearings 10 on the radially outer axle section end 5.1 as shown. The bearings 10 form second bearing means. However, in very lightweight constructions it may not be necessary to use any radial bearing at this point for the radially outer clutch component 7.1. In any event, the radially inner clutch component 7.2 and the radially outer clutch component 7.1 are both located around and radially outside the radially outer hollow axle end 5.1.

The connecting member 8 is torsion stiff. However, in order to avoid undesired tension stress and undesired bending stress of the connecting member 8 and related connecting elements, and in order to avoid stress on the bearings as much as possible, the connecting member 8 is constructed substantially without any bending stiffness. Such a structure can be achieved without any impairment of the torsion stiffness, for example, by constructing the connecting member 8 as a body made of fiber composite material embedded in a matrix material having a limited rubber elastic characteristic such as polyurethane forming the binding or embedding mass in which the fibers are oriented in a crosswise fashion relative to the longitudinal axis of the axle. Further, in order to avoid transmitting tension or bending stress through the member 8 it is possible to use conventional pivot or flexible connecting means between the member 8 and the ring 9 as well as between the member 8 and the radially outer clutch component 7.1.

The main advantage of the invention is seen in the fact that the first bearings 6 and the second bearings 10 are not required to be high performance bearings because these bearings have to run only at the differential r.p.m. which is established between the two wheels 2 and 3, or rather, between the two axle sections 4 and 5 with the aid of the magnetizable powder clutch 7.

Although the invention has been described with reference to specific example embodiments, it will be appreciated, that it is intended to cover all modifications and equivalents within the scope of the appended claims.

What we claim is:

1. A wheel set for rail vehicles, comprising an axle having a longitudinal axis, two wheels secured to said axle, said axle being divided into a first axle section and a second axle section, clutch means interconnecting said first and second axle sections for selectively permitting said first and second axle sections to rotate at different r.p.m.s for permitting a differential r.p.m., one of said axle sections having a hollow end forming a radially outer axle section end, the other of said axle sections having a radially inner axle stub forming a radially inner axle section end fitting into said hollow radially outer axle section end, first bearing means (6) interposed between said hollow radially outer axle section end and said radially inner axle stub for permitting relative rotation while preventing axial movement between said axle sections, said clutch means comprising a radially inner clutch component (7.2) and a radially outer clutch component (7.1), first means (7.5) rigidly securing said radially inner clutch component on said radially outer axle section end, second means for rotatably supporting said radially outer clutch component on said radially outer axle section end and for rigidly connecting said radially outer clutch component to said other axle section outside said radially inner axle stub, whereby both clutch components are mounted on said radially outer axle section end.

2. The wheel set of claim 1, wherein said first bearing means (6) comprise a pair of radial roller bearings mounted so that rollers of said roller bearings slant toward said longitudinal axis of the axle and opposite relative to each other, said roller bearings being mounted on said radially inner axle stub for permitting relative rotation between said hollow radially outer axle section end and said radially inner axle stub.

3. The wheel set of claim 1, wherein said second means for rigidly connecting said radially outer clutch component to said other axle section comprises an outer connecting member (8) rigidly secured to said other axle section (4), said outer connecting member (8) having a cantilever type end reaching over said hollow radially outer axle section end of said one axle section, said outer connecting member (8) being torsion stiff for transmitting torque from one axle section to the other axle section, said second means further comprises bearing means (10) being arranged between said cantilever type end of said outer connecting member and said hollow radially outer axle section end of said one axle section.

4. The wheel set of claim 3, wherein said torsion stiff outer connecting member comprises a portion having a defined bending characteristic for permitting a certain yielding to bending moments.

5. The wheel set of claim 3, wherein said outer connecting member comprises a torsion stiff sleeve type element (8) having a certain bending characteristic.

* * * * *